United States Patent
Weber

(10) Patent No.: US 11,197,578 B2
(45) Date of Patent: Dec. 14, 2021

(54) DEVICE FOR CLEANING AN ESPRESSO MACHINE

(71) Applicant: Douglas Weber, Itoshima (JP)

(72) Inventor: Douglas Weber, Itoshima (JP)

(73) Assignee: Strategic Exits LLC, Incline Village, NV (US)

( * ) Notice: Subject to any disclaimer, the term of this patent is extended or adjusted under 35 U.S.C. 154(b) by 1 day.

(21) Appl. No.: 16/791,865

(22) Filed: Feb. 14, 2020

(65) Prior Publication Data

US 2021/0251420 A1    Aug. 19, 2021

(51) Int. Cl.
*A47J 31/60* (2006.01)
*B08B 9/032* (2006.01)

(52) U.S. Cl.
CPC ............. *A47J 31/60* (2013.01); *B08B 9/0321* (2013.01); *B08B 2209/022* (2013.01); *B08B 2209/032* (2013.01)

(58) Field of Classification Search
CPC .. A47J 31/56; A47J 31/30; A47J 31/46; A47J 31/10; A47J 31/24; A47J 31/40; A47J 31/4403; A47J 31/00; A47J 31/44; A47J 31/60; A47J 31/16; B08B 9/00–46; B08B 2209/00–085

USPC ................. 99/280, 284, 285, 294, 295, 300; 126/369.2, 369.3, 377.1
See application file for complete search history.

(56) References Cited

U.S. PATENT DOCUMENTS 5,127,318 A * 7/1992 Selby, III ............ A47J 31/0663
99/295

* cited by examiner

*Primary Examiner* — Mikhail Kornakov
*Assistant Examiner* — Richard Z. Zhang
(74) *Attorney, Agent, or Firm* — Todd R. Miller

(57) ABSTRACT

A back-blush cleaning container may have a spring-biased piston that allows the container to fill with hot water when attached to a group head of the espresso machine. When the hot water of the espresso machine is turned off, the piston due to the spring urges the hot water out and back through a 3-way valve to clean the espresso machine. The backflush cleaning container also may have a steam conduit that allows steam from a steam wand of the espresso machine to clean the group head, 3-way valve and tubes. Moreover, the container may have a window which based on the position of the piston, a particular color is shown. The colors indicate whether the container is safe to remove from the group head of the espresso machine and when the container is full of water.

5 Claims, 12 Drawing Sheets

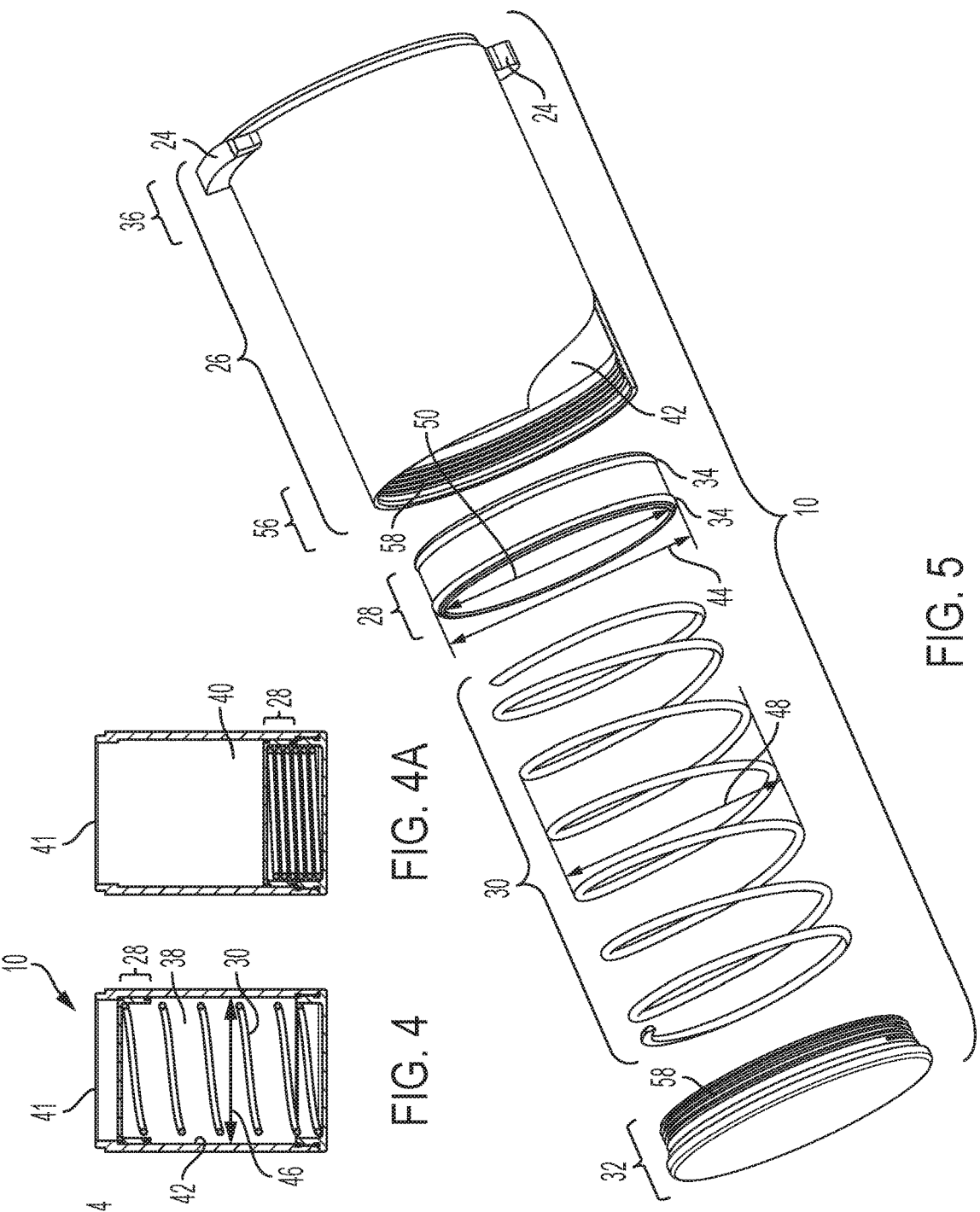

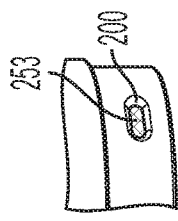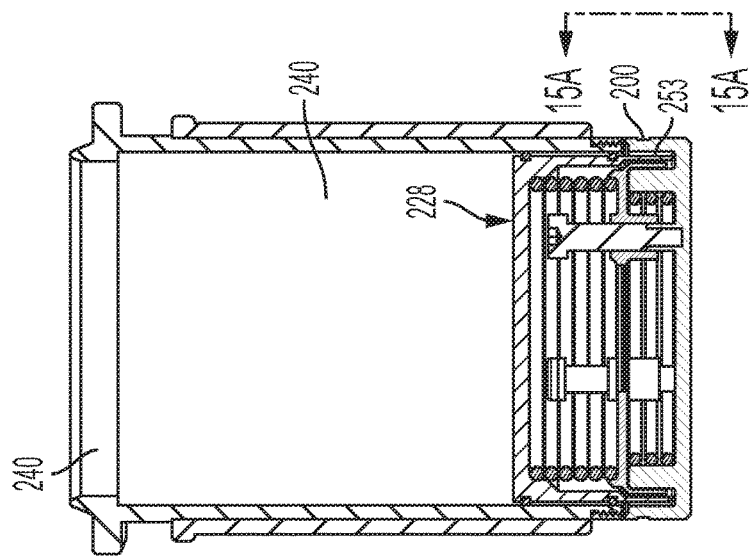
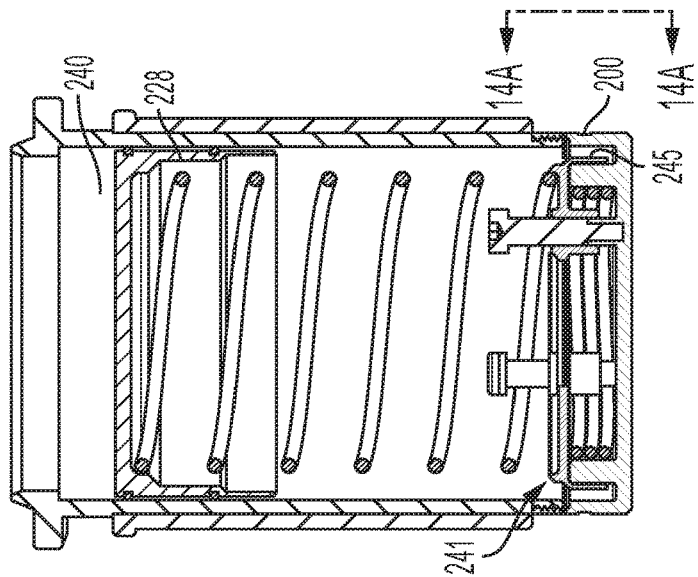
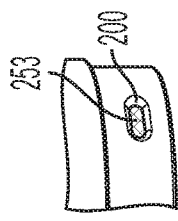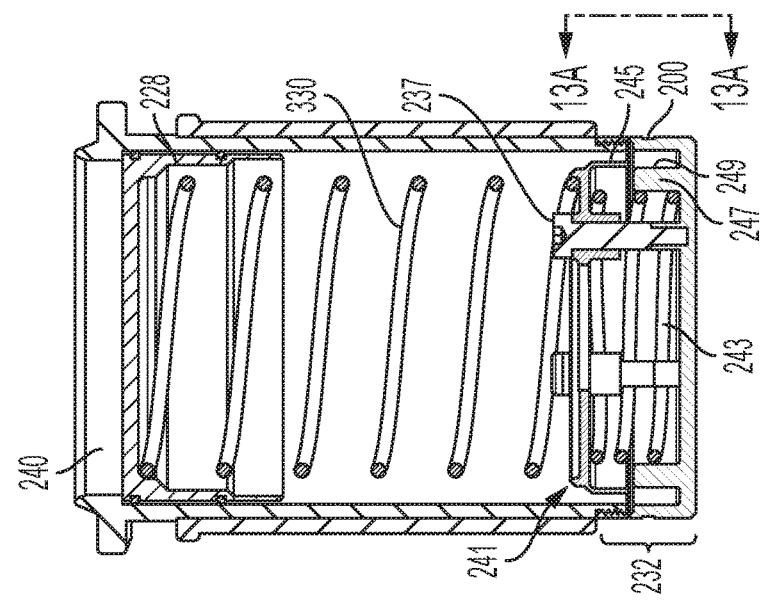

DEVICE FOR CLEANING AN ESPRESSO MACHINE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various aspects described herein relate to a device and method for cleaning a three-way valve, group head including dispersion screen of the group head and conduit associated therewith of an espresso machine.

In an espresso machine, the same must be cleaned regularly. However, regularly and thoroughly cleaning the espresso machine may be difficult to do.

Accordingly, there is a need in the art for a new method and device for cleaning the espresso machine.

BRIEF SUMMARY

A backflush cleaning container is disclosed herein. The container may have a piston that defines a variable volume. The container may be attached to a group head (i.e., brew head) of an espresso machine and filled with hot water. When the group head expels hot water into the container, the piston moves from an up position to a down position. The piston may be biased toward the up position so that when the espresso machine or hot water is turned off, the water in the container is pushed back through the espresso machine. The hot water flows through a 3-way valve. Preferably, the spring is strong enough to create turbulent flow in the 3-way valve. Additionally, the device may have an attachment for receiving steam from a steam wand of the espresso machine. Steam may run through the container and be forced into the group head including the dispersion screen, 3-way valve and tubes associated therewith to clean the same. Moreover, the container may have a color-coded window which indicates the position of the piston so that the user knows when it is safe to disengage the container from the group head and when the container is full of hot water.

More particularly, a backflush cleaning container attachable to group head of an espresso machine for backflushing a group head including dispersion screen, valve and tubes associated therewith of the espresso machine with water to clean the espresso machine is disclosed. The container may comprise a body, a piston, and a first spring. The body may have an interior cavity for holding water. The body may have a lower portion and an upper portion with an opening at the upper portion. The body may have two wedge-shaped tangs extending outward at the upper portion of the body. The body may be removably engageable to a group head of the espresso machine via the two wedge-shaped tangs. The piston may be slidably disposed within the interior cavity of the body between up and down positions. The piston and the opening of the body at the upper portion define a variable volume for backflushing the group head including dispersion screen, valve and tubes associated therewith of the espresso machine. The first spring may be positioned in the interior cavity underneath the piston for biasing the piston to the up position.

The backflush cleaning container may further comprise a steam tube, a fitting, a steam conduit and a one-way valve. The steam tube may establish fluid communication between the steam wand of the espresso machine and the backflush cleaning container. The fitting may be attached to the backflush cleaning container. The steam conduit may be attached to the fitting for establishing fluid communication between the steam wand of the espresso machine and the variable volume when the steam tube is connected to the fitting on the body of the backflush cleaning container. The one-way valve may be disposed in the steam conduit for allowing steam to flow from the steam wand to the espresso machine but block a flow of fluid from the espresso machine to the steam wand.

The bottom portion of the body may have a window so that a first color is shown through the window when the piston is in the up position, a second color is shown through the window when the piston is between up and down positions, and a third color is shown through the window when the piston is in the down position.

The backflush cleaning container may further comprise a second spring disposed between a bottom cap and a plate. The first spring may be disposed between the piston and the plate. The second spring may provide a greater spring force than the first spring when the piston is in the up position. The second spring may provide a lesser spring force than the first spring when the piston is in the down position.

The first color may be on the body and viewable through the window. The second color may be on a plate of an indicator system and viewable through the window when the piston is between the up and down positions. The third color may be on the piston and viewable through the window when the piston is in the down position.

In another aspect, a method of cleaning a group head including dispersion screen, valve and tubes associated therewith of an espresso machine is disclosed. The method may comprise the steps of attaching a backflush cleaning container to a group head of the espresso machine, the backflush cleaning container having a variable volume between a first volume and a second volume, the first volume being larger than the second volume, the first volume being associated with a piston of the backflush cleaning container positioned at a down position, the second volume being associated with the piston of the backflush cleaning container positioned at an up position, the piston being biased from the down position to the up position; turning on a hot water supply to flow hot water through the group head to establish fluid communication between the water tank and the group head; flowing water through a heater to make the water hot; filling the variable volume with the hot water so that the piston traverses toward the bottom position until the backflush cleaning container holds more than the second volume of hot water; turning off the hot water supply to block fluid communication between the water tank and the group head and establish fluid communication between the group head and a drip tray through the valve; allowing hot water in the backflush cleaning container to flow back through the valve and into the drip tray for cleaning the group head including dispersion screen, valve and tubes associated therewith. As discussed herein, drip tray may refer to a tray which may or may not be plumbed into a sink.

The method may further comprise the steps of providing a window in a bottom portion of a body of the backflush cleaning container, a first color being viewable through the window when the piston is in an up position, a second color being viewable through the window when the piston is between the up and down positions, a third color being viewable through the window when the piston is in the down position; viewing the first color upon turning on the hot water supply; viewing the second color after water is introduced into the backflush cleaning container; viewing the third color when the piston is in the down position which indicates that the backflush cleaning container is full of hot water.

The method may also further comprising the steps of attaching a steam tube to a steam wand of the espresso machine and a fitting of the backflush cleaning container; turning on the steam wand of the espresso machine to flow steam through the backflush cleaning container and to the valve for cleaning the group head including dispersion screen, valve and tubes associated therewith.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 3 is a front view of the backflush cleaning container;

FIG. 4 is a cross-sectional view of the backflush cleaning container shown in FIG. 3 with a piston in an up position;

FIG. 4A is a cross-sectional view of the backflush cleaning container shown in FIG. 3 with a piston in a down position;

FIG. 5 is an exploded perspective view of the backflush cleaning container shown in FIGS. 3 and 4;

FIG. 13A illustrates a window of the backflush cleaning container showing a first color;

FIG. 13B illustrates a position of the piston and the indicator system when the first color is showing through the window;

FIG. 14A illustrates a window of the backflush cleaning container showing a second color;

FIG. 14B illustrates a position of the piston and the indicator system when the second color is showing through the window;

FIG. 15A illustrates a window of the backflush cleaning container showing a third color; and FIG. 15B illustrates a position of the piston and the indicator system when the third color is showing through the window.

DETAILED DESCRIPTION

Figure 2:
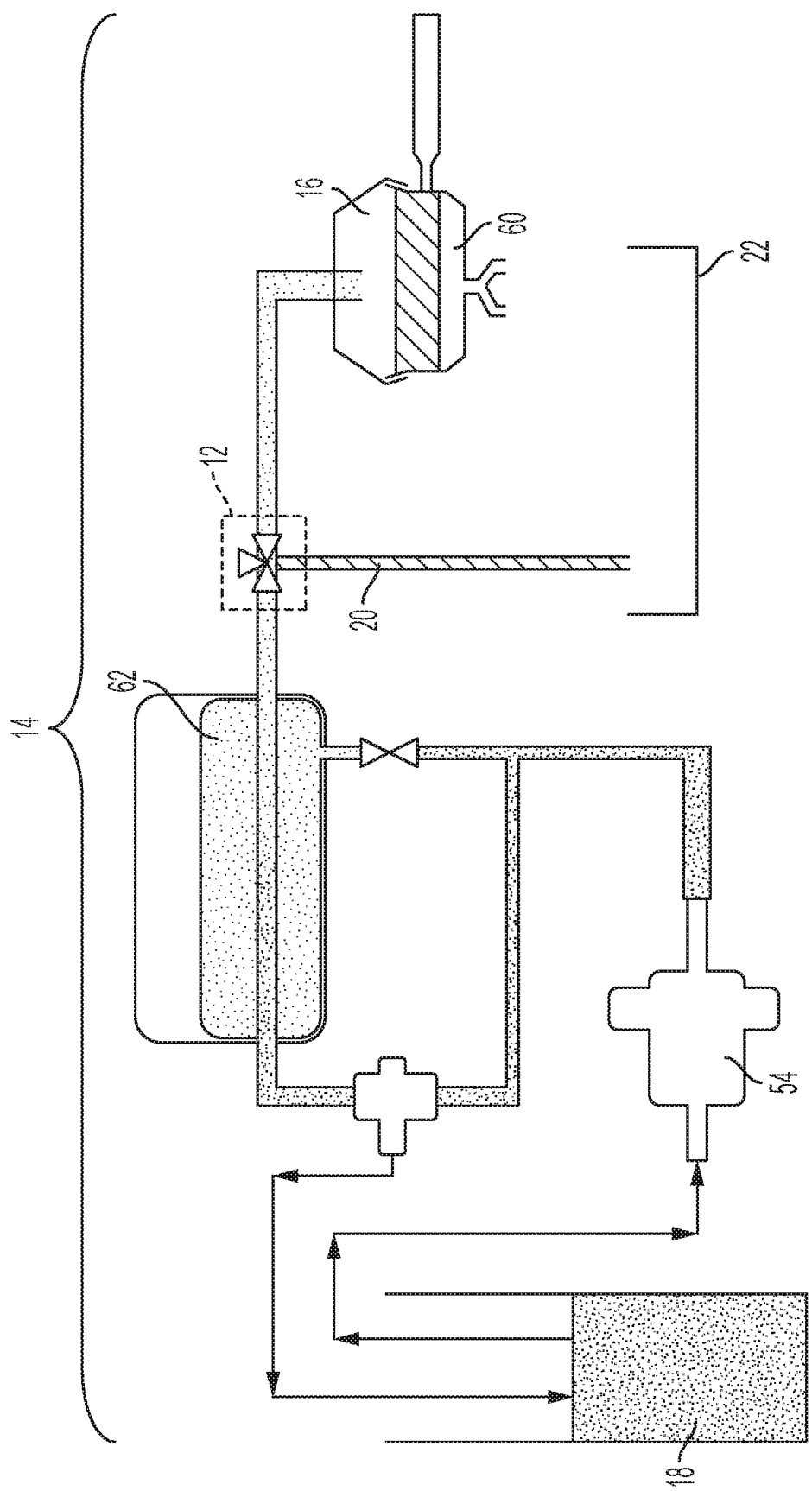
FIG. 2 is a schematic view of the espresso machine shown in FIG. 1 while it is being used to brew espresso.
Figure 2A:
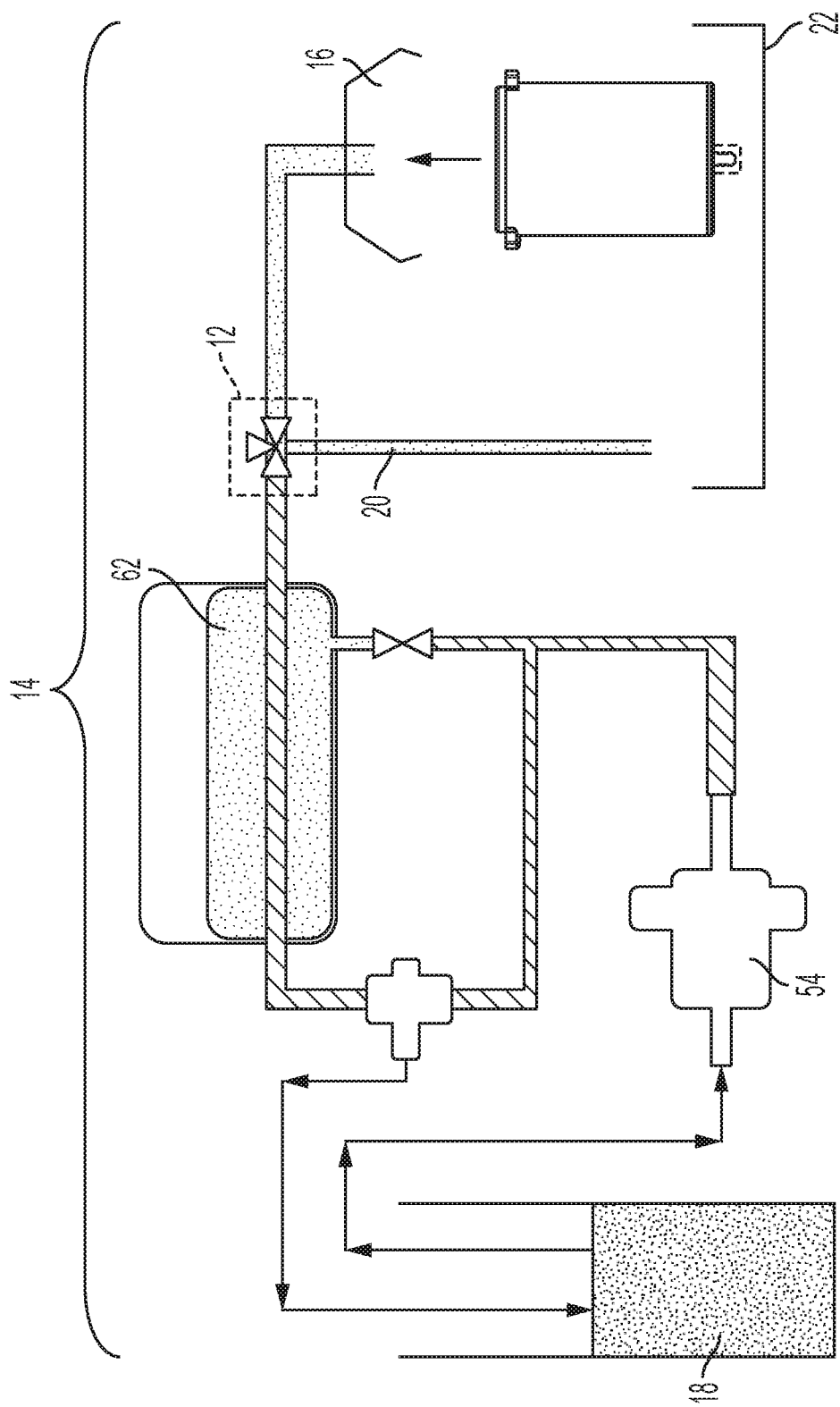
FIG. 2A is a schematic view of the espresso machine shown in FIG. 1 while it is being cleaned with a backflush cleaning container.

Referring now to the drawings, a backflush cleaning container 10 (See FIGS. 3-5) is shown. The backflush cleaning container 10 may be used to clean a three (3) way valve 12 (see FIG. 2), group head 16 (including dispersion screen) and tubes associated therewith of an espresso machine 14. This three (3) way valve 12, group head 16 and tubes associated therewith normally accumulates oil from the coffee and coffee fines over a period of time as the espresso machine 14 is used. Periodic cleaning of the three (3) way valve 12, group head 16 and tubes associated therewith is necessary to maintain operation of the espresso and to prevent breakage. To clean the three (3) way valve 12, group head 16 and tubes associated therewith, the backflush cleaning container 10 may be attached to a group head 16 (see FIG. 2A). The user may then turn on the hot water of the espresso machine 14 which fills the backflush cleaning container 10 with hot water. The three (3) way valve 12 is set to allow water to flow from the water tank 18 to the backflush cleaning container 10, as illustrated in FIG. 2A. Once the backflush cleaning container 10 is filled, the user may turn off the hot water. At this time, the three (3) way valve 12 closes off fluid communication between the water tank and the backflush cleaning container 10 and opens fluid communication between the backflush cleaning container 10 and the backflush outlet 20 and the drip tray 22, as illustrated in FIG. 2B. At this point, the backflush cleaning container 10 is spring-loaded and biased so that the hot water in the backflush cleaning container 10 pushes the water through the group head 16 including dispersion screen, through the three (3) way valve 12, through the backflush outlet 20 and into the drip tray 22. The backflush cleaning container 10 may have a volume of water that is significantly more than what can be held in a blank portafilter. As such, the backflush cleaning container 10 is effective in backflushing the group head including the dispersion screen, three (3) way valve 12 and tubes associated therewith for cleaning coffee oils and fines on the same. The container 10 may be used with at least cycles of flushing. In a first cycle, detergent may be placed into the container and mixed with the hot water which is then backflushed into the espresso machine. In a follow up second cycle, no detergent is used to eliminate any detergent residue in the espresso machine.

Referring now to FIGS. 3-5, the backflush cleaning container 10 is shown. The backflush cleaning container 10 may have wedge-shaped tangs 24 that may be removably engaged to receiving notches and corresponding wedge-shaped tangs of the group head 16. When the espresso machine 14 is being used to brew espresso, the backflush cleaning container 10 is not mounted to the espresso machine 14. However, during the scheduled maintenance of the espresso machine 14, the user may attach the backflush cleaning container 10 to the group head 16 of the espresso machine 14 to backflush the group head including dispersion screen, three (3) way valve 12 and the tubes associated therewith.

Figure 3A:
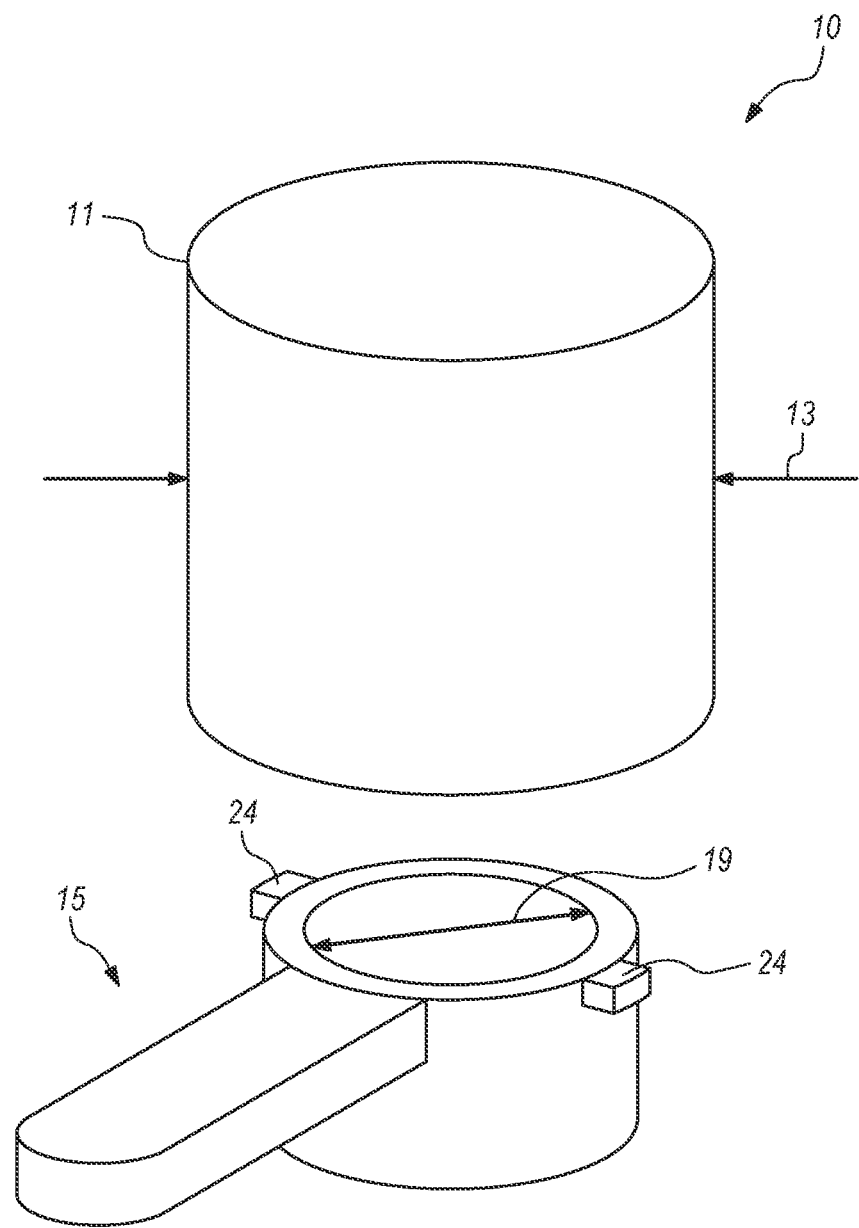
FIG. 3A is a perspective view of a variant of the backflush cleaning container.

Although all of the embodiments shown and discussed herein have wedge-shaped tangs integrated into the container for securing the container to the group head, it is also contemplated that the wedge-shaped tangs of all embodiments may be separate from the container, as shown in FIG. 3A. In FIG. 3A, the container may have a flange 11 and define an outer diameter 13. A handle 15 may have the wedge-shaped tangs 24 and a ring 17 with an inner diameter 19 which snugly fits the outer diameter 13 of the container 10. It is further contemplated that the container shown and discussed herein may be attached to the group head 16 via other mechanisms other than the traditional wedge-shaped tangs.

The backflush cleaning container 10 may have a body 26, a piston 28, a spring 30, a bottom cap 32, two (2) O-rings 34. The body 26 may have a cylindrical configuration. As discussed above, the tangs 24 may be removably engageable to the group head 16 of the espresso machine 14. The tangs 24 may be attached to the body 26 on opposed sides of a circumference of the body 26 at the upper portion 36 of the body 26. The body 26 may also define an interior cavity 38 the interior cavity houses the piston 28 and the spring 30, as shown in FIG. 4. When the container 10 is assembled, the piston is traversable between an up position (see FIG. 4) and a down position (see FIG. 4A). When the piston 28 is in the down position as shown in FIG. 4A, the piston is biased toward the up position as shown in FIG. 4. When hot water is filled in the backflush cleaning container 10, it is disposed within a variable volume 40. A maximum volume of the variable volume 40 may be 8.3 ounces. As the piston 28 moves toward the up position as shown in FIG. 4, the water is urged out of an opening 42 of the container 10.

Piston 28 may have an outer periphery that matches an inner surface 42 of the body 26. By way of example and not limitation, an exploded view of the container is shown in FIG. 5. The piston 28 may have a circular disc-shaped configuration and the inner surface 42 of the body 26 may have a matching cylindrical configuration. An outer diameter 44 of the piston 28 may be slightly smaller than an inner diameter 46 defined by the inner surface 42 (FIG. 4). To mitigate water from filling the bottom half of the body 26 as the water fills the container 10 through the opening 41 of the body 26, O-rings 34 are mounted to the piston 28 to prevent or mitigate water from seeping into the other side of the piston 28 as water fills the variable volume 40. Some water may seep past the piston 28 but so long as the water is not allowed to freely bypass the piston 28, water may still be forced out of the container 10 as the piston 28 is traversed from the bottom position to the up position via the spring 30.

The spring 30 may be a compression spring. The spring 30 may be disposed between the bottom cap, 32 and the piston 28. The spring 30 may have an outer diameter 48 which is smaller than an inner diameter 50 of the piston 28. The outer diameter 48 of the spring 30 may also be less than an inner diameter of the bottom cap 32. The spring may be received and held in place by the bottom cap and the piston 28. The spring may have a spring rate that is sufficiently high to push water through the group head including dispersion screen, three (3) way valve and tubes associated therewith at a rate at which the hot water cleans these components and exits the backflush outlet 20. Moreover, the spring rate of the spring 30 may be sufficiently low so that the piston 28 maybe traverse to the bottom position when the container 10 is attached to the group head 16 and the hot water is turned on and flowing through the group head 16 and into the container 10. Put simply, the spring rate of the spring 30 may be sufficiently low so that the pump 54 (see FIG. 2) can generate enough force to compress the spring 30 and allow the water to fill the variable volume and the piston 28 to traverse to the bottom position. By way of example and not limitation, the spring rate of the spring may be adjusted so that the spring 30 applies an initial force of 2.24 lbs after an initial compression (i.e., spring pre-compression) of 0.79 inches. When the piston is fully at the down position (i.e., max spring compression), the force from the spring 30 may be 22.48 lbs after a max spring compression of 2.82 inches. An exemplar spring rate of spring 30 may be 7.97 lbs per inch.

The bottom cap 32 may be removably attachable to a bottom portion 56 of the body 26 via threads 58. The bottom cap 32 may be removed from the body 26 to clean and lubricate (if needed) the backwash cleaning container 10 or to fix the same if something is broken. The bottom cap 32 provides a liquid-tight seal against the bottom portion 56 of the body 26. Similarly, the upper portion 36 of the container 10 forms a liquid-tight seal with the group head 16 when the container 10 is connected to the group head 16.

Figure 1:
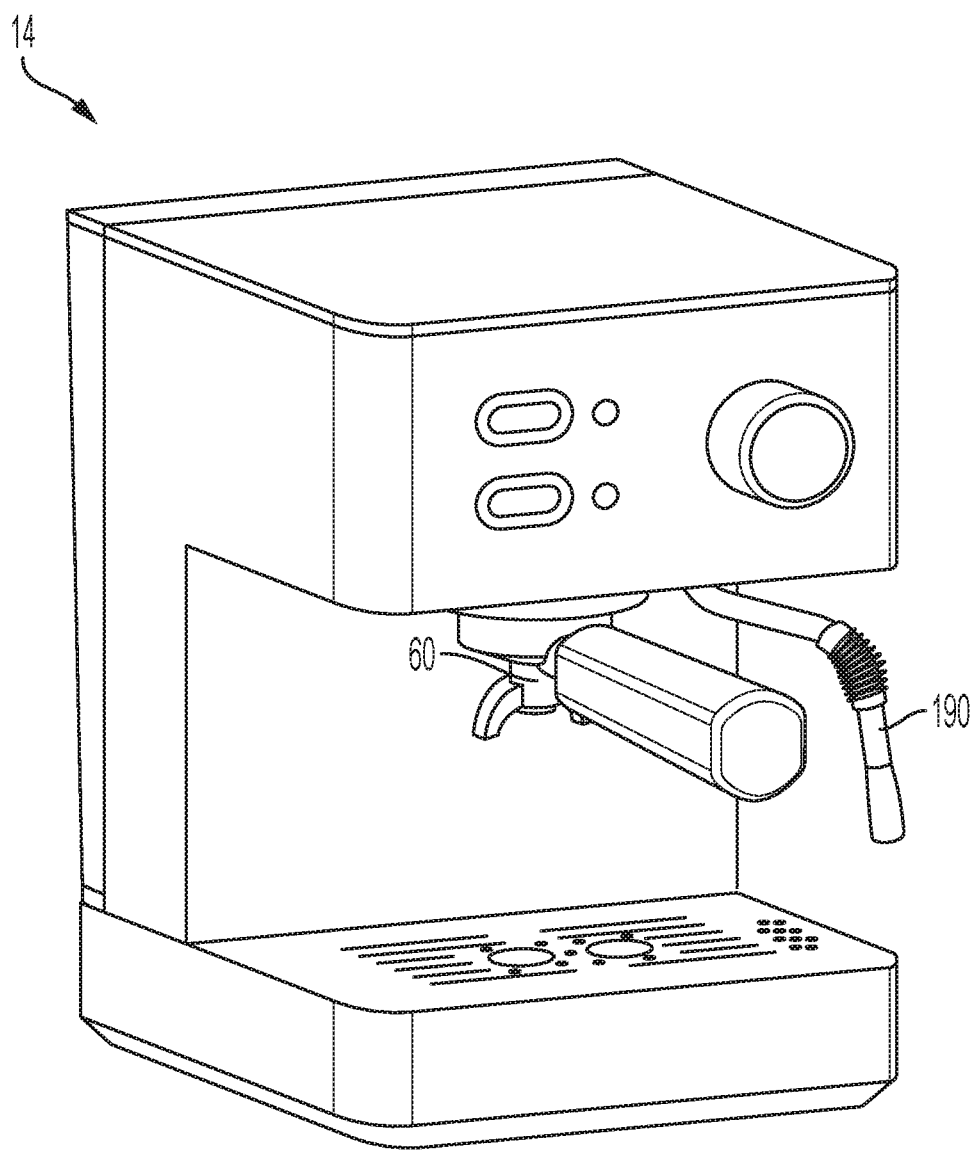
FIG. 1 is a perspective of an espresso machine.

To use the backflush cleaning container 10, the portafilter 60 (see (FIGS. 1 and 2) is removed from the group head 16. After it is removed, the container 10 is attached to the group head 16, as shown in FIG. 2A. More particularly, the tangs 24 of the body 26 of the container 10 are aligned to notches in the group head 16. The tangs 24 are pushed through the notches of the group head 16 and the container 10 may be rotated in a locking direction so that the tangs 24 are wedged against the mating tangs in the group head 16. At this point, the user may turn on the machine so that hot water flows through the group head 16. In particular, water is drawn from the water tank 18 and into a heat exchanger 62. In the initial backflush cycle, optionally, detergent may have been placed in the container to clean the espresso machine with a detergent during the first backflush cycle. The three (3) way valve is positioned to provide fluid communication from the water tank 18 to the group head 16, as shown in FIG. 2. Hot water is pushed out of the group head 16 and into the variable volume 40 defined by the piston 28, the inner surface 42 of the body 26 and the group head 16. The machine is left on so that hot water fills the variable volume 40 and presses or pushes the piston 28 toward the bottom position. Preferably, the machine is left on so that hot water pushes the piston 28 all the way to the bottom position. Alternatively, the machine may be left on for a certain amount of time (eg 5 seconds, 10 seconds, et cetera). This estimates the amount of water being filled in to the variable volume 40 of the container 10. When the machine is turned off, the machine resets the three (3) way valve so that no fluid communication exists between the water tank and the group head 16. Rather, fluid communication is now established between the group head and the backflush outlet 20.

When the piston is in the bottom position as shown in FIG. 4A, the piston 28 is biased upward and the water in the variable volume 40 is urged out of the container 10 unless it is blocked. The spring pushes the piston 28 toward the up position and forces the water out of the container 10 through the three (3) way valve 12 and out of the backflush outlet 20. This backflush provides for cleaning of the three (3) way valve, group head including the dispersion screen and the tubes associated therewith. It is also contemplated that a second or multiple backflush cycle(s) may be performed without detergent.

Figure 6A:
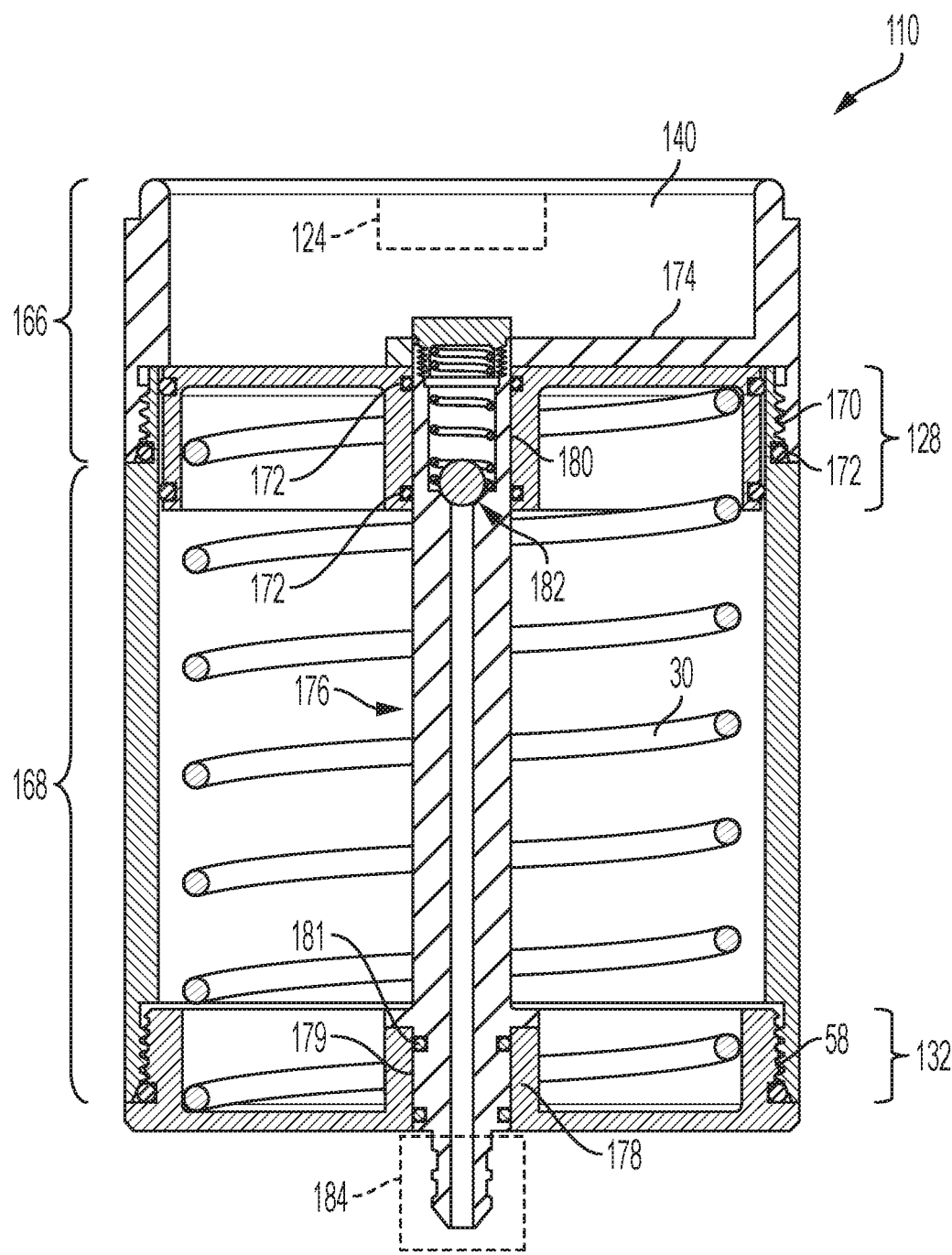
FIG. 6A is a cross-sectional view of a second embodiment of the backflush cleaning container with a steam conduit and the piston is in an up position.
Figure 6B:
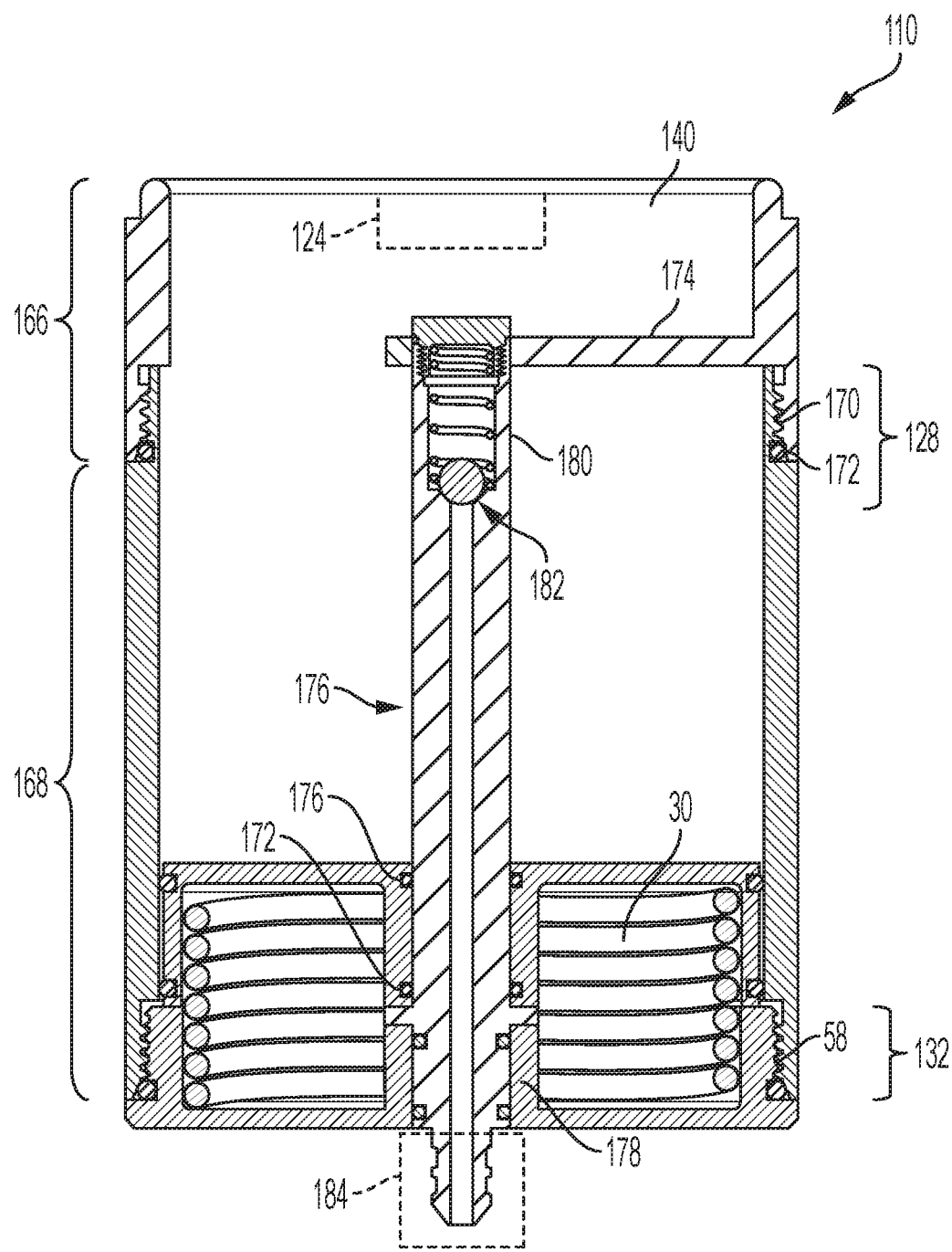
FIG. 6B is a cross-sectional view of the second embodiment of the backflush cleaning container with the steam conduit and the piston is in a down position.

Referring now to FIGS. 6A and 6B, a variant of the backflush cleaning container 110 is shown. This, the cleaning container 110 may operate identically to the container 10 and have the same structure as described above except for the following features. In particular, the container 110 may also be used to steam clean the group head including dispersion screen, three (3) way valve 12 and tubes associated therewith. The container may have a body 126. The body may have an upper cap 166 and a midportion 168. The upper cap 166 and the midportion 168 may be removably attachable to each other such as by threads 170. An O-ring 172 may be disposed between the upper cap 166 and the midportion 168 to form a liquid-tight seal between these two components 166, 168. The upper cap 166 may also have a tang 124 as discussed above. The upper cap 166 may also have an inwardly directed support member 174. The support member may stabilize a steam conduit 176. The steam conduit 176 may be stabilized at the other end by way of the bottom cap 132. The upper cap 166 may have a cylindrical configuration and allow water to pass through the upper cap 166. The piston 28 and the spring 30 may operate in the same manner as described above in relation to the container 10. That is, to bias the piston to the up position.

The bottom cap 132 may be removably engageable to the midportion 168 through threads 58. The bottom cap 132 may have a support member 178 that also provides for a through-hole to receive the steam conduit 176.

The piston 128 may additionally have a through-hole 179 and O-rings 181 and form a watertight seal with the steam conduit 176. In particular, the steam conduit 176 may be cylindrical and the through-hole 180 formed in the piston 28 may be sized and configured to slidingly fit therebetween. O-rings 172 may be mounted to the piston 128 to provide for a watertight seal therebetween. As the piston 128 transitions between the up position shown in FIG. 6A and the down position shown in FIG. 6B, the water that fills the container 110 in the variable volume 140 would generally not seep past the piston 128 and the not enter space on the other side of the piston 128.

Figure 6C:
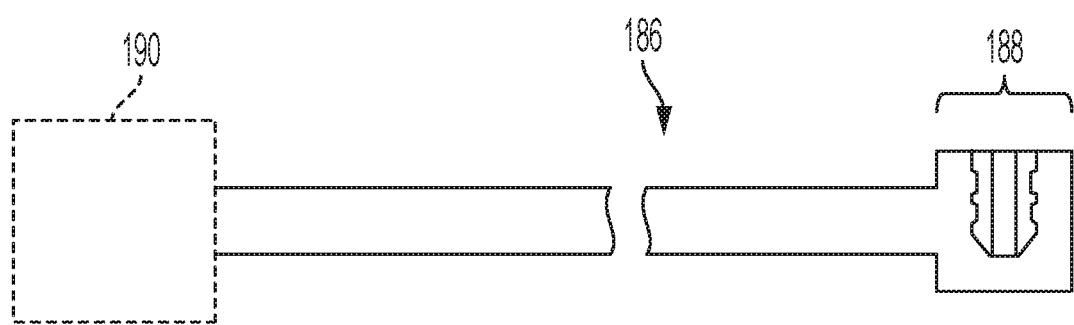
FIG. 6C illustrates a steam tube that connects a steam wand of the espresso machine and a fitting of the steam conduit of the backflush cleaning container.

The steam conduit 176 may have a one-way valve 182. When water is being filled into the variable volume 140, the one-way valve 182 prevents escape of the water through the steam conduit 176. Additionally, the steam conduit 176 may protrude beyond the bottom cap 132 to expose a fitting 184 that receives a tube 186. The tube 186 shown in FIG. 6C may have the mating fitting 188 that connects to the fitting 184 of the steam conduit 176.

During the cleaning operation, the operator may attach the tube 186 to the steam wand 190 (also FIG. 1) and the fitting 184. The fitting 188 of the tube 186 may be connected to the fitting 184 of the steam conduit 176. With the machine turned off and hot water not running through the group head 16, the user may turn on the steam wand to generate steam through the steam wand 190. It is also contemplated that the steam may be generated with a steam wand of an espresso machine next to the espresso machine currently being cleaned or even a separate steam source not associated with an espresso machine. Steam travels through the tube 186 and through the steam conduit 176. The one-way valve 182 is open so that steam is allowed to fill the variable volume 140 and traverse through the three-way valve 12. This cleans or exposes the deposits (i.e., caked-on) of oil and coffee fines on the surfaces of the group head including dispersion screen, three-way valve 12 and tubes associated therewith to higher temperature steam to break down the deposits (i.e., caked-on) of oil and coffee fines. Thereafter, the user may turn off the steam. In and at this point, the one-way valve 182 returns to the closed position. The user may backflush the group head including dispersion screen, three-way valve 12 and tubes associated therewith by turning on the hot water and in the same manner as described above in relation to container 10. After one or two backflushes, the user may turn the steam back on to once again introduce steam or high-temperature steam onto the surfaces of the group head including dispersion screen, three-way valve and tubes associated therewith to clean and disinfect the same.

Figure 9:
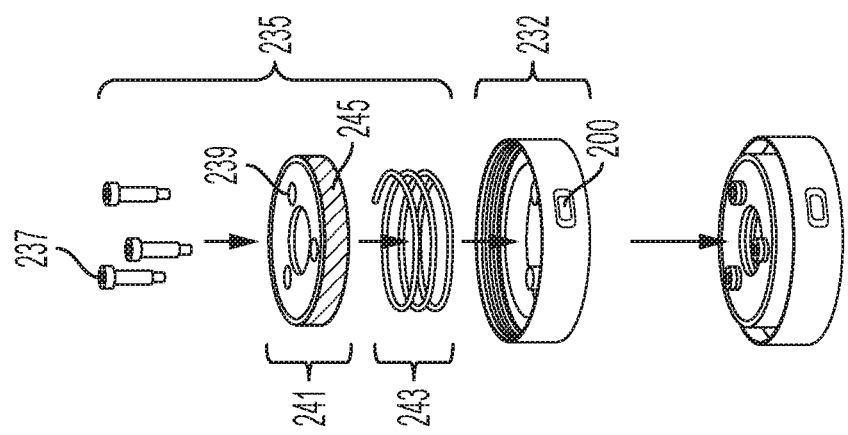
FIG. 9 is an exploded perspective view and assembled view of an indicator system and bottom cap.

Referring now to FIGS. 7-12, the container 10, 110 may be modified to indicate when the piston 28, 120 is in the up or down positions. The container 210 may have a window 200 which shows a first color, second color, or third color depending on whether the piston 28, 128 is in the up position, between up and down positions or down position. The container 210 may have a body 226, piston 228, spring 330, bottom cap 232, sleeve 233, indicator system 235. Referring now to FIG. 9, the indicator system 235 is secured to the bottom cap 232 with offset screws 237. These offset screws may be received into holes 239 formed in a plate 241. The indicator system 235 may also have a secondary spring 243 which acts in conjunction with the spring 330 to either position the plate 241 in the up position common shown in FIG. 13B, the down position as shown in FIG. 15B or therebetween as shown in FIG. 15C. When the plate 241 is in the down position as shown in FIG. 15B, an exterior surface 245 is viewable through the window 200 (See FIGS. 7, 8, 9, and 15B). When the plate 241 is in the up position as shown in FIG. 13B, the exterior surface 245 of the plate 241 is not seen through the window 200. Rather, the cap 232 may have a cylindrical wall 247 that receives the secondary spring 243 therein. Moreover, the exterior surface 245 of the plate is received on the outside of the wall 247 when the plate 241 is in the down position (See FIG. 15B). However, when the plate 241 is in the up position, an exterior surface 249.

Figure 10:
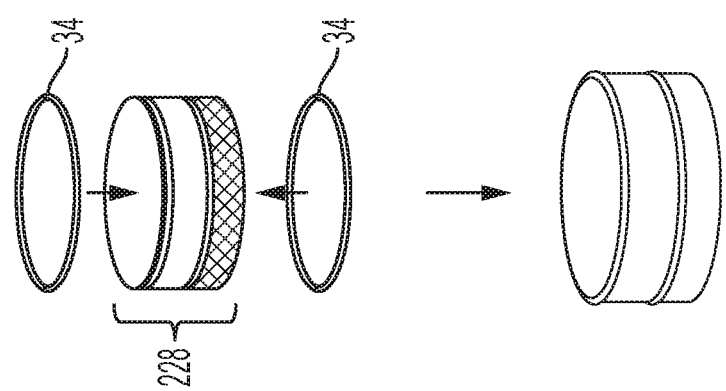
FIG. 10 illustrates a piston with two (2) O-Rings.

Referring now to FIG. 10, the piston 228 may also have two O-rings 34 that help to prevent liquid from seeping past the piston 228 and entering the cavity on the other side of the variable volume 240 (See FIG. 14B).

Figure 11:
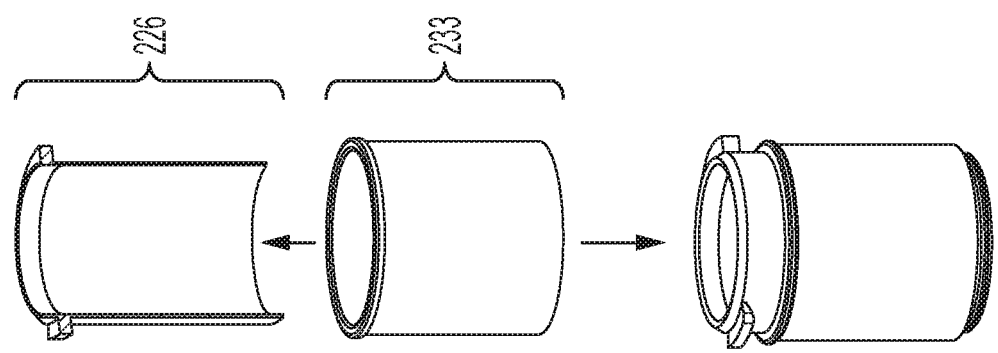
FIG. 11 illustrates a body with a sleeve.

Referring now to FIG. 11, the body 226 may be received into sleeve 233.

Figure 7:
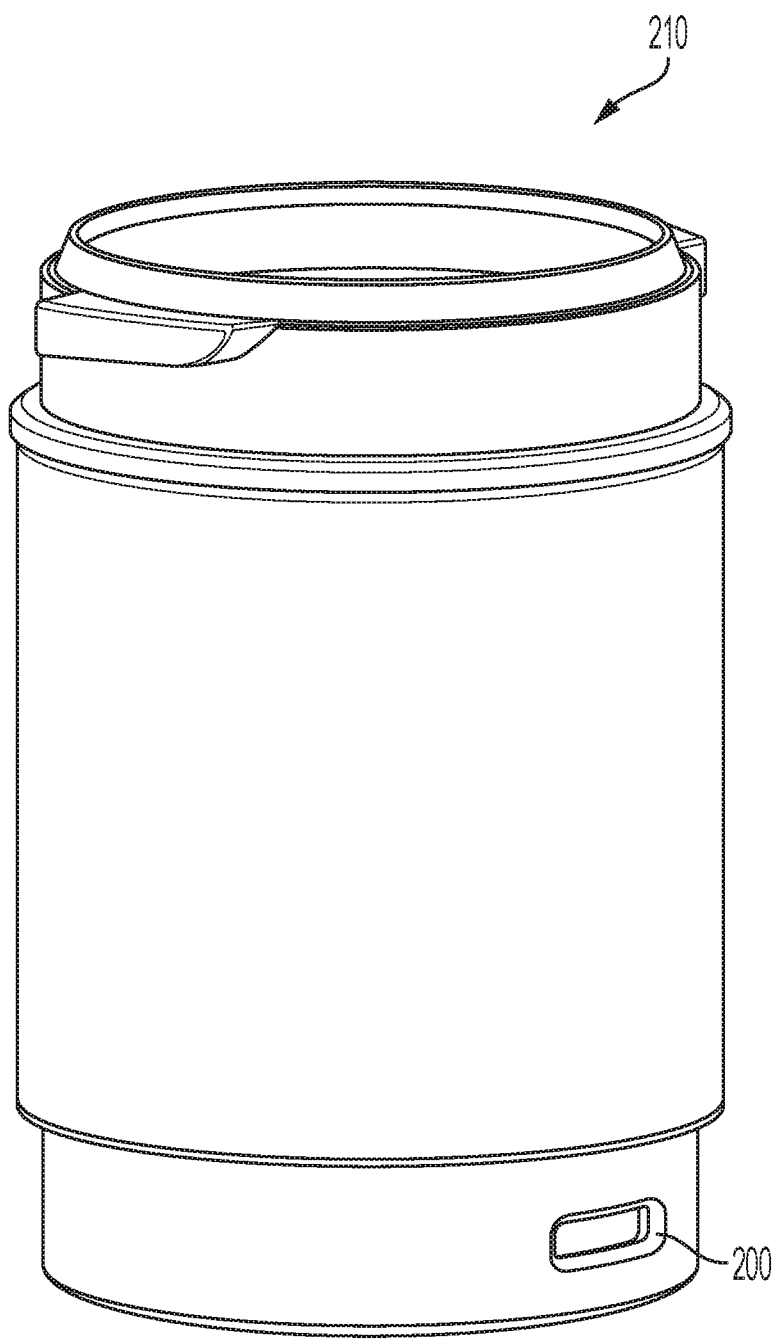
FIG. 7 is a third embodiment of the backflush cleaning container having a color-coded viewing window for indicating a position of the piston of the backflush cleaning container.
Figure 8:
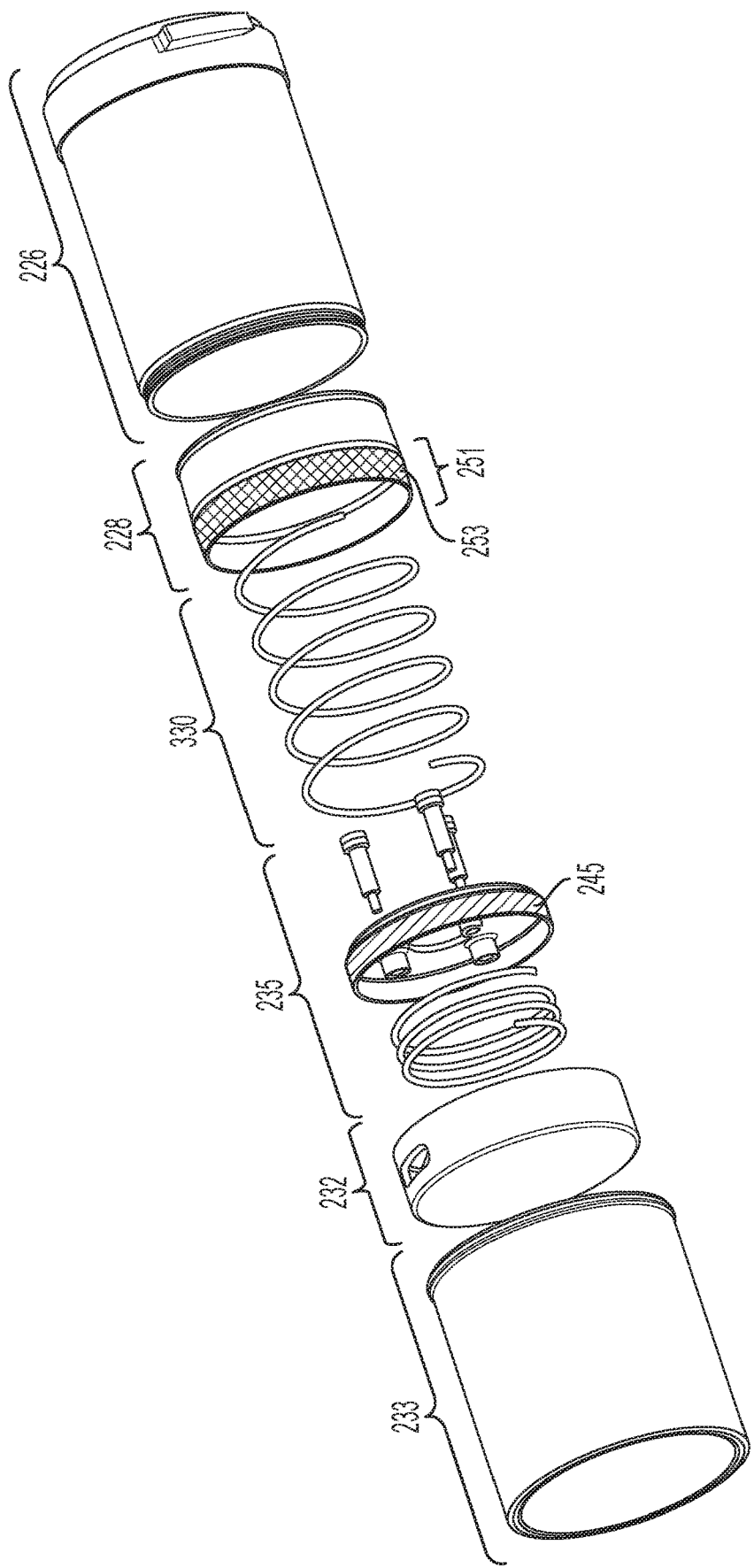
FIG. 8 is an exploded perspective view of the backflush cleaning container shown in FIG. 7.
Figure 12:
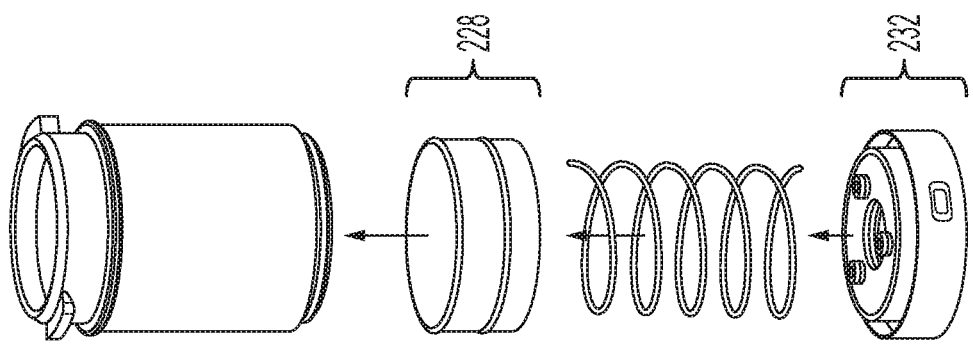
FIG. 12 is an exploded perspective view of the body with sleeve, piston with O-Rings, spring and an indicator system attached to a bottom cap.

Referring now to FIG. 12, to assemble the container 210, the piston 228 with O-rings 34 may be inserted into the body 226. The spring may be inserted underneath the piston 228 to urge the piston 228 toward the up position. Additionally, the bottom cap 232 which has the indicator system 235 may be screwed onto the bottom portion of the body to assemble the container 210 (FIG. 7).

During operation, the piston 228 is in the up position as shown in FIG. 13B. The window 200 shows a first color (green color) painted or printed on the exterior surface 249. This first color represents the piston 228 in the up position. Moreover, the plate 241 is in the up position because at this point, the secondary spring 243 provides a greater upward force than the downward force generated by the spring 330. For example, the spring 243 may provide an upward force greater than 2.24 lbs provided that the spring 330 is identical to spring 30 in terms of the spring rate and the initial and max displacement thereof. The plate 241 is limited in its upward travel due to the offset screws 237. The heads of the offset screws 237 prevent the plate 241 from traversing any further upward beyond the head of the screws 237.

When the container 210 is attached to the group head 16 and the hot water turned on, water begins to fill the variable volume 240. The variable volume begins to enlarge and get filled with water and the piston 228 is traversed toward the bottom position. As the piston 228 is traversed toward the bottom position, the spring 330 begins to compress and also generate more downward force. As the downward force generated by the spring 330 increases, it becomes greater than the upward force generated by the secondary spring 243. For example, the downward force may be greater than the maximum force generated by spring 330. At this point, the plate 241 is traversed toward the bottom position as shown in FIG. 14B. When the plate 241 is in the bottom position, an exterior surface 245 on a flange is viewable through the window 200. The exterior surface 245 may be colored with a second color, which represents that the piston 228 is not in the up or down positions. As the water begins to fill the variable volume 240, the piston 228 will bottom out as shown in FIG. 15B. The piston 228 may have a flange 251 (FIG. 8) with a colored pigmentation applied there too. The exterior surface 253 is now viewable through the window 200. When the user sees the third color, this represents or indicates that the container 210 is full of water and the user can now turn off the machine and turn off the hot water to backflush the system and clean the group head including dispersion screen, three-way valve and tubes associated therewith.

When the hot water of the espresso machine is turned off, the hot water in the variable volume 240 is pushed through the group head, 3 way valve and the hot water cleans and disinfects the group head including dispersion screen, 3 way valve and tubes associated therewith. The aspects describe in relation to FIGS. 7-15B may also include the steam conduit 176.

The springs discussed herein may be fabricated from stainless steel. Other materials are also contemplated but preferably corrosion-resistant materials are used. By way of example and not limitation, the springs may be fabricated from plastic. The O-rings discussed herein may be fabricated from silicon. The body, the bottom cap, the piston may be fabricated from aluminum, stainless steel or plastic.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A backflush cleaning container attachable to a group head of an espresso machine for backflushing the group head and a valve of the espresso machine with water to clean the espresso machine, the backflush cleaning container comprising:
    a body having an interior cavity for holding water, the body having a lower portion and an upper portion with an opening at the upper portion, the body having two wedge-shaped tangs extending outward at the upper portion of the body, the body being removably engageable to the group head of the espresso machine via the two wedge-shaped tangs;
    a piston slidably disposed within the interior cavity of the body between an up position and a down position, the piston and the opening of the body at the upper portion defining a variable volume for backflushing the group head, the valve and a plurality of tubes of the espresso machine;
    a first spring disposed in the interior cavity underneath the piston for biasing the piston to the up position.

2. The backflush cleaning container of claim 1 further comprising:
    a steam tube for establishing fluid communication between a steam wand of the espresso machine and the backflush cleaning container;
    a fitting attached to the backflush cleaning container;
    a steam conduit attached to the fitting for establishing fluid communication between the steam wand of the espresso machine and the variable volume when the steam tube is connected to the fitting on the body of the backflush cleaning container;
    a one-way valve in the steam conduit for allowing steam to flow from the steam wand to the espresso machine but block a flow of fluid from the espresso machine to the steam wand.

3. The backflush cleaning container of claim 1 wherein the bottom portion of the body has a window so that a first color is shown through the window when the piston is in the up position, a second color is shown through the window when the piston is between the up position and the down position, and a third color is shown through the window when the piston is in the down position.

4. The backflush cleaning container of claim 3 further comprising:
    a second spring disposed between a bottom cap and a plate, and the first spring is disposed between the piston and the plate;
    wherein the second spring provides a greater spring force than the first spring when the piston is in the up position, and the second spring provides a lesser spring force than the first spring when the piston is in the down position.

5. The backflush cleaning container of claim 3 wherein the first color is on the body and viewable through the window, the second color is on a plate of an indicator system and viewable through the window when the piston is between the up position and the down position, and the third color is on the piston and viewable through the window when the piston is in the down position.

* * * * *